United States Patent [19]

Hazelrigg, Jr.

[11] Patent Number: 5,481,102

[45] Date of Patent: Jan. 2, 1996

[54] MICROMECHANICAL/MICROELECTRO-MECHANICAL IDENTIFICATION DEVICES AND METHODS OF FABRICATION AND ENCODING THEREOF

[76] Inventor: George A. Hazelrigg, Jr., 4623 N. 4th Rd., Arlington, Va. 22203

[21] Appl. No.: 220,506

[22] Filed: Mar. 31, 1994

[51] Int. Cl.⁶ .............................. G06K 7/06; G06K 7/08; G06K 19/00

[52] U.S. Cl. .......................... 235/487; 235/435; 437/249; 437/927

[58] Field of Search .................................. 235/435, 487; 437/249, 927

[56] References Cited

U.S. PATENT DOCUMENTS

| | | | |
|---|---|---|---|
| 1,364,025 | 12/1920 | Billings | 283/901 |
| 1,372,036 | 3/1921 | Olsen | 283/901 |
| 1,887,324 | 11/1932 | Pocoroba | 283/901 |
| 4,010,354 | 3/1977 | Apicella, Jr. et al. | 235/376 |
| 4,686,515 | 8/1987 | Anderson et al. | 340/572 |
| 4,827,110 | 5/1989 | Rossi et al. | 235/376 |
| 4,839,875 | 6/1989 | Kuriyama et al. | 369/14 |
| 4,959,515 | 9/1990 | Zarracky et al. | 200/181 |
| 5,001,933 | 3/1991 | Brand | 73/651 |
| 5,142,128 | 8/1992 | Perkin et al. | 235/375 |
| 5,166,676 | 11/1992 | Milheiser | 340/825 |
| 5,182,543 | 1/1993 | Siegel et al. | 340/531 |
| 5,202,281 | 4/1993 | Ishibashi | 437/927 |
| 5,324,688 | 6/1994 | Kondo | 437/921 |

FOREIGN PATENT DOCUMENTS 4020752 10/1991 Germany .............................. 235/435

OTHER PUBLICATIONS

W. Ehrfeld et al, Liga Process . . . Lithography Rec. IEEE Solid–State Sensor & Actuator Workshop, 1988 pp. 1–4.
H. A. C. Tilmans et al, Single Element . . . Mechanical Resonator 91CH2817–5/91/0000–0533 1991 IEEE pp. 533–537.
K. Peterson et al, Surface Machined . . . Fusion Bonding 91CH2817–5/91/0000–0397 1991 IEEE pp. 397–399.
A. K. Fedder et al, Thermal Assembly . . . Microstructures Univ. of Calif. at Berkeley.
C. H. Mastrangelo, A Simple . . . Microstructures 0–7803–0456–X/92, 1992 IEEE pp. 208–212.
R. A. Buser et al, Tunini Forks in Silicon TH0249–3/89/0000/0019 1989 IEEE pp. 94–95.
H. Guckel et al, Polysilicon Resonant . . . Senior Applications, 0–7803–0456–X/92, 1992 IEEE pp. 153–156.
S. Bouwstra et al, Base Driven Micromechanical Resonators–7803–0456–X/92, 1992 IEEE pp. 148–152.
H. Guckel, Deep X–Ray . . . Micromechanics CH2783–9/90/0000–0118 1990 IEEE pp. 118–122.
G. T. Mulhern, Supercritical . . . Microstructures Univ. of Calif. of Berkeley.
M. A. Allen, Polyimide–Based Processes . . . Microstructures Georgia Instit. of Technology.

*Primary Examiner*—John Shepperd

[57] ABSTRACT

Encoded devices, for marking various products to which the devices are attached, comprise a comb-like structure comprising a plurality of cantilevered "teeth" or "tines" of different lengths extending from a common support. Each tine has a resonant frequency of vibration dependent upon the length of the tine, and the pattern of tines present on the device comprises the encoded data. Reading of the encoded data is done by setting the tines into vibration and determining the pattern of tines by detecting the presence of the resonant frequency vibrations of the respective tines. Excitation of and read-out of the tines can utilize acoustic, magnetic or electrostatic energy. Fabrication of the devices is preferably done using materials and processes utilized in semiconductor device manufacture. The comb-like structure can be a harp-like structure including beams extending between and secured to opposite sides of the structure, and selected beams are partially severed to provide tines. Alternately, only tines are initially provided and selected times are severed from the structure. Severing of beams or tines is done electrically or mechanically. Also, various materials can be added to the tines for facilitating both the severing and reading out processes.

21 Claims, 4 Drawing Sheets

MICROMECHANICAL/MICROELECTRO-MECHANICAL IDENTIFICATION DEVICES AND METHODS OF FABRICATION AND ENCODING THEREOF

BACKGROUND OF THE INVENTION

This invention relates to devices for the unique marking and identification of various products, e.g., credit cards, machine parts, computer chips, bullets, etc., and to the fabrication and encoding of such devices, and particularly to the secure encoding of devices. By "secure encoding" is meant encodings which are difficult to change and/or eradicate, and which survive usage of the encoded product.

A wide variety of systems have been recently developed for mounting or implanting devices in various products as a means for marking, e.g., identifying the products. Possibly the best known product example is the "smart card", comprising a plastic credit card having embedded therein a microelectronic semiconductor device including a programmable memory. Using appropriate writing means, data about the owner of the card, including identification and financial data, can be written into the memory and later read out by insertion of the card into an appropriate read out machine located on a merchant's premises or the like.

Numerous other examples of systems and devices for uniquely encoding products are known and described, for example, in the following U.S. patents, the subject matter of which are incorporated herein by reference: U.S. Pat. Nos. 5,142,128 (Perkin et al), 4,010,355(Opicella, Jr. et al), 4,839,875 (Kuriyama et al), 4,827,110 (Rossi et al), 5,182,543 (Siegel et al), 5,166,676 (Milheiser), 4,959,515 (Zavrachy et al), 4,685,515 (Anderson et al), 5,175,424 (Lisimaque) and 4,752,776 (Katzenstein). The various devices and systems disclosed in these patents are likely useful, but all contain limitations and disadvantages relating, primarily, to large size, ability to operate in difficult media, strength or ability to withstand acceleration, the need for electrical or other connections, and/or the ability to be embedded in a hidden location in a product.

For example, and with reference to certain of the patents in the foregoing list having similarities to the present invention, Zavrachy et al (U.S. Pat. No. 4,959,515) disclose a structure comprising a plurality of cantilevered beams, the free ends of which overlie electrodes on a substrate. Upon the application of electrical charges to the beam ends and electrodes, the beams are deflected, thereby changing the spacing between the beam ends and the electrodes, and thereby providing an electrically detectable event, e.g., a variation in a parameter of an electrical circuit. By selectively disconnecting various ones of the beams from the associated electrical circuits, only selected beams remain to generate electrical signals upon the application of the electrical charges. The pattern of signals thus produced corresponds to a unique code for the device.

Disadvantages of the device are that it includes numerous electrical circuits all of which have to be individually addressed. The device is thus relatively complex, cannot be hidden in a product, and cannot withstand high temperatures.

Anderson (U.S. Pat. No. 4,686,515) discloses the use of a strip of magnetostrictive, amorphous metal adapted to be magnetically biased for mechanical resonance at a known frequency. Although not disclosed in the patent, the metal strip or strips are somehow positioned on a marker applied to the product to be identified so that each strip is free to vibrate. By applying to the markers both a dc bias field and an ac interrogation field from a reading mechanism, energy is alternately stored and released with the frequency of the ac field. The quantities of energy storage and release are greatest at the mechanical resonance frequency of the strip, hence an electrical signal is generated having a unique pattern characteristic of the particular resonant frequency of the strip. While the patent refers to the use of "strips", the patent is entirely silent as to how such plural strips would be fabricated, encoded, mounted and decoded. Also, the system disclosed is complex and expensive.

Not included in the foregoing list is U.S. Pat. No. 5,001,933 (Brand), which relates not to an identification system but to a vibration sensor. This patent discloses structure related to the present invention in that cantilevered beams are used, but, as with U.S. Pat. No. 4,959,515, the beams are individually electrically addressed, hence the device and associated systems are comparatively complex and expensive.

As explained hereinafter, the present invention provides significant advantages over the prior art.

SUMMARY OF THE INVENTION

An encoded, readable device in accordance with this invention comprises a comb-like structure having a plurality of "teeth" or tines of different length, each tine having a resonant frequency dependent upon its length and structure. In a preferred embodiment, the device is initially formed as a harp-like structure including a plurality of different length beams extending between opposed sides of the structure. For writing a code into the structure, selected ones of the beams are severed, e.g. electrically or mechanically, close to one side of the structure providing a plurality of cantilevered beams, i.e., the aforementioned tines. Alternately, the initial device includes only cantilevered tines, and selected tines are removed leaving an encoded pattern of cantilevered tines. The pattern of tines provides a binary or other code. Each of the different length tines has a unique resonant frequency, and by exciting all the tines into vibration, either simultaneously or sequentially, and detecting which resonant frequencies are produced, the information encoded on the device can be read.

Depending upon the material of the tines material added to the tines, the exciting energy can be acoustic, electrical, magnetic, or electrostatic, and the resonant frequency of the vibrating tines are detected as corresponding acoustic, electrical, magnetic, or electrostatic signals.

Preferably, the devices are fabricated using processes known in the semiconductor device industry, i.e., using known photolithographic processes whereby extremely small devices can be made. The encoded devices, which may be suitably encapsulated, can be embedded in or incorporated with products to be marked for identification or the like, and, depending upon the products involved, the devices can be interrogated with or without removing the devices from the product.

DESCRIPTION OF PREFERRED EMBODIMENTS

Figure 1:
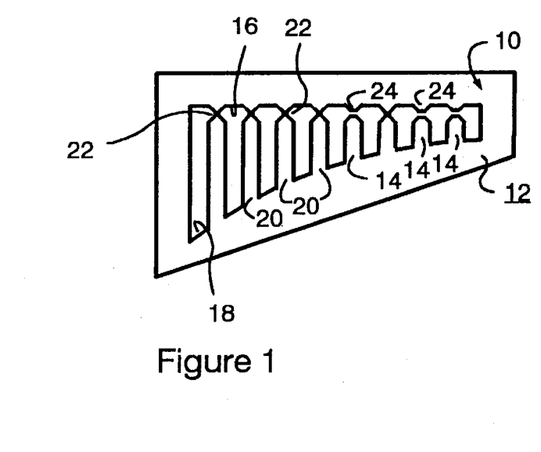
FIG. 1 is a plan view of an encoded marking device in accordance with this invention.

FIG. 1 shows a plan view of an encoded marking device 10 in accordance with this invention. The device 10 comprises a support structure 12, having a harp-like configuration, and a number of cantilevered beams or tines 14 extending from one side 18 of the structure 12 towards the other side 16. The tines 14 are interspersed among a number of beams 20 extending from side 16 to side 18 of the structure 12. The pattern of the tines 14 provides a binary code. Thus, in the embodiment illustrated in FIG. 1, eight digit positions are shown and, reading from right to left and reading tines as ones and beams as zero, the binary number 00001011 is illustrated which is equivalent to the base 10 number 11. With eight digit positions, $2^8$ different patterns or codes are possible. Using a process described hereinafter, devices having over 40 different length beams can be provided enabling 1 trillion and possibly more individual codes.

As shown in FIG. 1, each beam 20 is provided with a necked-in portion 22 adjacent to the side 16, and the tines 14 are provided by severing selected beams at the portions 22. The various beams 20 and tines 14 vary in length from end to end of the structure. Each tine 14 has a natural resonant frequency which is a function of its length.

By exciting the tines into vibration at their resonant frequencies and detecting which frequencies are produced, the pattern of tines present on the device 10 can be detected and the encoded number of the device can be determined.

Means for exciting the tines into vibration and detecting the output vibrations are described hereinafter.

The pattern of tines can also be determined optically, e.g., read similarly as a printed bar code is read or under a microscope. This is most practical, for example, when the device 10 is removed for reading from the product being identified. Also, imaging of the encoded device can be done while the device is embedded in a product using, depending upon the media of the product, acoustic, x-ray, magnetic resonance imaging or other known imaging systems.

It is noted that the connected beams 20, of varying lengths, also have respective resonant frequencies and, if desired, the resonant frequencies of the beams can also be detected. In general, however, this is not preferred because the amplitude of vibrations of the beams is significantly less than that of the cantilevered tines 14, thus making detection of the beam vibration frequencies more difficult. Thus, in the preferred embodiments, only the vibration frequencies of the tines are detected. The resonant frequencies of the beams are greater than those of the tines, hence discrimination between the two sets of frequencies is readily accomplished.

Also, while the stubs 24 (FIG. 1) remaining after the beams 20 are severed to produce tines 14 also vibrate, they all do so at the same frequency (being of equal lengths) and at a much higher frequency than that of the shortest tine.

In use of the devices 10, they are, preferably, first encoded, e.g., with a preselected, unique number, encapsulated within a housing or enclosure (described hereinafter) and then mounted in or on a product to be identified or "marked." The marking devices can be extremely small, e.g., comprising an encapsulated structure having a thickness of 0.2 mm, a length of 0.5 mm, and a maximum width of 0.3 mm (at the left-hand end of the structure shown in FIG. 1). Because of the possible small size of the marking devices, they can be directly embedded and hidden within small products such as credit cards and bullets. For example, an encapsulated marking device is disposed within a suitable mold (not illustrated) and a plastic forming fluid forced into the mold to flow around the device during the formation of a credit card.

Figure 2:
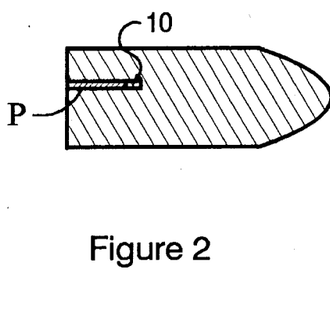
FIG. 2 is a cross-sectional view of a bullet containing an inventive marking device.

In the case of bullets, the encapsulated device is pressed into a hole drilled or cast into the bullet (FIG. 2), and the hole is filled with a plug P, e.g., of lead for a lead bullet. In order to increase the degree of difficulty in disabling or removing the identification device, the device can be placed in the bullet slightly off center. This makes its location difficult to identify and thus difficult to disable or remove the device from the bullet without destroying the bullet. Also, because of the possible small size and mass and strength of the encapsulated marking devices, as explained hereinafter, the marking devices can generally survive firing of the bullets for identification of fired and recovered bullets.

The marking devices 10, either alone or encapsulated, can be mounted on or within a large variety of products similarly as the marking devices shown in the aforecited patents. Thus, as in the aforementioned credit cards, the marking devices can be "embedded" within the product. Or, as in the aforementioned bullets, the devices can be "inserted" or "mounted" within the product. Further, as described hereinafter, the marking devices can comprise an integral portion of the product, e.g., a large scale integrated computer semiconductor chip.

Figure 3:
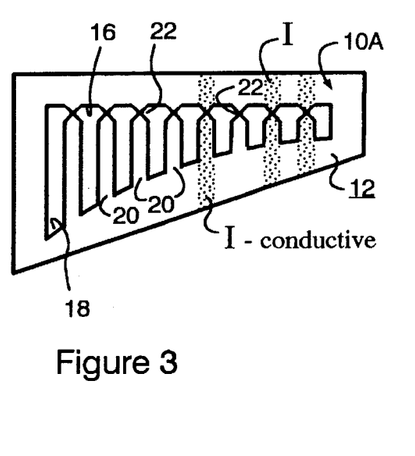
FIG. 3 is a plan view of a marking device in accordance with this invention prior to final encoding; and showing one example of how encoding can be performed.

As above-indicated, each device can be uniquely encoded by means of the pattern of tines present. In a preferred embodiment, the encoded device 10 shown in FIG. 1 is fabricated, as described hereinafter, initially as a tine-less device 10A as shown in FIG. 3. The device 10A contains eight beams 20 all of which extend from side to side of the structure 12. All the beams include, at the same distance from the side 16 of the structure 12, necked-in portions 22. Encoding of the device 10A is done by severing selected beams 20 at the necked-in portions. Preferably, a process is used which provides at least a small gap between the end of the thus formed tine and the remaining stub 24 (FIG. 1) to allow unimpeded vibration of the line.

Examples of suitable processes for severing the selected beams 20 include melting the beams at the necked-in portions by passing electrical currents through the selected beams (e.g., by making the selected beams electrically conductive as indicated in described hereinafter), breaking the selected beams mechanically, e.g., using a micro manipulator, and vaporizing the necked-in portions using radiant energy, e.g., a laser or electron beam. The use of such laser or electron beams are the preferred techniques particularly because apparatus suitable for rapidly scanning products, e.g., semiconductor wafers, and inscribing data or patterns using laser or electron beams in small spaces are commercially available.

As previously noted, read-out of the encoded data on the various devices described herein is accomplished by exciting the tines into vibration and identifying the pattern of tines present in the devices by detection of their respective resonant frequency vibrations. Generally, the arrangement for exciting the tines into vibration will correspond to the arrangement for detecting the resonant frequencies present. Also, the choice of exciting and detecting arrangements will generally depend upon the material of the product on or in which the identifying device is mounted.

For reasons of simplicity and cost effectiveness, the preferred exciting and detection arrangements involve mechanical energy, preferably in the form of acoustic waves. Thus, by applying mechanical energy by means of a sharp blow from a hammer or the like, or by applying vibratory energy by means of a transducer held against the product containing the marking device, or directly on the marking device, all the tines are simultaneously set into vibration, each at its respective natural resonant frequency (similarly as conventional tuning forks are set into vibration). With extremely small marking devices, e.g., having the aforementioned dimensions, the resonant frequencies of the tines are high, and a high frequency acoustic signal or a square wave pulse (e.g., such as generated by the aforementioned hammer blow) is used to excite all the tines.

The resulting audio vibrations can be detected by microphone (e.g., a sensitive piezoelectric sensor), and the microphone output signal is frequency analyzed to determine which frequencies are present. The detected frequencies correspond to the pattern of tines present, hence provide a read-out of the encoded data. The technology needed for applying acoustic energy to the marking devices and for detecting the device generated acoustic vibrations is known and can be similar to that used in commercial ultrasound imaging processes. Suitable frequency analyzers are also known.

In a preferred arrangement, an acoustic transducer can be used which provides a sweep frequency output signal, i.e., a continuous audio signal whose frequency varies with time. The transducer signal is applied to the marking device, either directly or via the product containing the device, and, as the variable frequency signal approaches the resonant frequency of each tine, each tine is successively excited into resonant vibration. Obviously, the range of swept frequencies corresponds to the range of frequencies of all possibly present tines, and, preferably, does not include frequencies corresponding to those of any beams 20 (FIG. 1 ) or stubs 24 present in the encoded device. The advantage of using such sweep frequency excitation is that the sensitivity of the frequency detection apparatus can be increased.

In some instances, depending primarily upon the product employing the marking device, it may not be practical to use acoustic energy, e.g., in situations where the device is embedded in acoustic energy absorbing material or where the product itself generates interfering acoustic signals.

One alternative approach is the use of magnetic energy both for exciting the tines into vibration and detecting the resulting vibrations. To this end, the tines are made sensitive to an alternating direction magnetic field, typically by incorporating a magnetic material in the tines, and read-out is also accomplished by magnetic means. For example, if the tines themselves are made of a magnetic material, e.g., iron or nickel, or a layer of such magnetic material is attached to or embedded in the tines, the tines will be urged in opposite directions by an appropriately oriented alternating magnetic field. A sweep frequency magnetic field is preferred to excite all the tines present into vibration at their resonant frequencies. That is, all the tines will simultaneously vibrate in direct response to and at the instantaneous frequency of the alternating direction magnetic field, but the amplitudes of vibration of the tines will significantly increase when the instantaneous frequency of the magnetic field corresponds to the resonant frequency of the respective tines.

Known techniques can be used to detect the resonant frequencies of the various tines. For example, a coil of wire placed adjacent to the excited marking device will generate a varying current in response to the varying strength magnetic fields produced at the coil by the vibrating tines. In one technique, the exciting magnetic signal comprises a series of time separated pulses, each pulse containing a different frequency signal. Thus, the tine generated signals can be detected between exciting pulses. Also, in other known techniques, the absorption of energy by the tines from the exciting field distorts the exciting field, and the distorted exciting field is reflected back into the exciting field transmitter where the distortions are detected.

Another approach, otherwise similar to the aforedescribed use of magnetic energy, is the use of electrostatic energy. In this approach, electrical charges are stored on the tines, whereby the tines are urged in opposite directions by an appropriately oriented alternating electric field. The vibrating tines thus produce variable strength electrostatic fields with respect to a fixed receiving antenna. The marking devices can be made of various materials and manufactured using various technologies. For example, the marking devices can be made of metal, e.g., stainless steel, and formed by a stamping process or by pattern etching a metal plate.

A preferred technology, particularly if extremely small marking devices are to be made, is the use of processes well known in the semiconductor arts. In the following description, which identifies various known processes and processing materials, known details are not provided.

Figure 4:
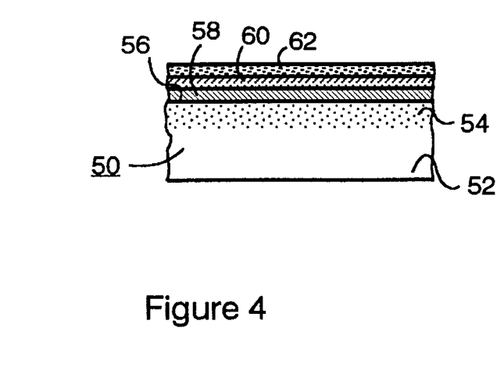
FIG. 4 shows, in section, a portion of a typical workpiece used in the fabrication of a marking device in accordance with the invention.

FIG. 4 shows a portion of a monocrystalline silicon wafer 50. As is common in the semiconductor art, a relatively large (e.g., 3 inch or even larger diameter) wafer is used and a large number of identical devices are simultaneously formed on the wafer. Typically, the different devices are formed in spaced apart rows and columns of devices, and, after completion of various device forming processes, the wafer is diced into individual "chips", each containing but a single device.

The silicon wafer has a thickness depending upon the particular marking device being made. Typically, the wafer thickness will be between 250 and 500 microns in accordance with extensively used semiconductor technology. Thinner wafers, e.g., 25–50 microns, can be used. At the stage of fabrication shown in FIG. 4, the wafer includes a lower portion 52 of intrinsic (undoped) silicon and a relatively thin, e.g., 1–5 microns thick, upper portion 54 which is doped with boron or phosphorous at a uniform concentration of $10^{14}$ to $10^{19}$ atoms/cm$^3$, which doping corresponds to a conductivity of 100 to 0.001 ohm-cm.

The surface 56 of the wafer 50 is covered with a first layer 58 of undoped polysilicon, e.g., having a thickness of about 10 microns, a second layer 60 of silicon dioxide, e.g., having a thickness of a few microns, and a known photoresist layer 62, e.g., AZ1300 Series. The doping of silicon wafers and formation of such layers 58, 60 and 62 thereon are well known.

Figure 5:
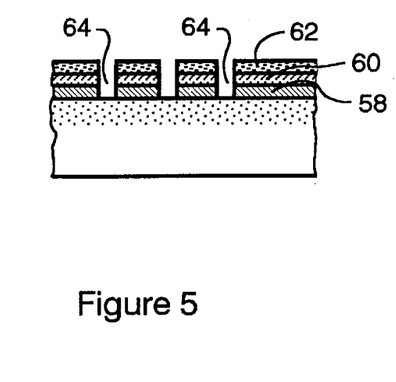
FIGS. 5–7 are views similar to FIG. 4 but showing the workpiece at successive stages of manufacture.

Then, using known photolithographic techniques, the photoresist layer 62 is exposed through a mask and developed to form openings 64 (FIG. 5) through the photoresist layer 62 in a desired pattern. For example, if devices 10A such as shown in FIG. 3 are being fabricated, the openings 64 define a pattern as shown in FIG. 3. Then, using the photoresist layer 62 as an etch mask, the pattern in the photoresist layer 62 is reproduced (FIG. 5) in the underlying silicon dioxide and polysilicon layers 60 and 58 by successive known etching processes.

Figure 6:
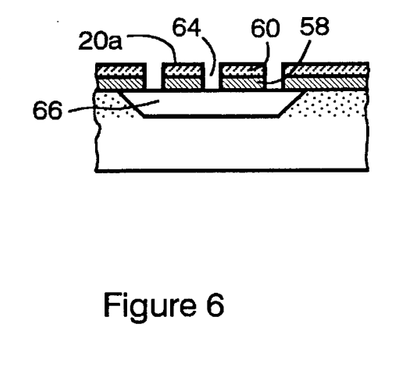
Figure 7:
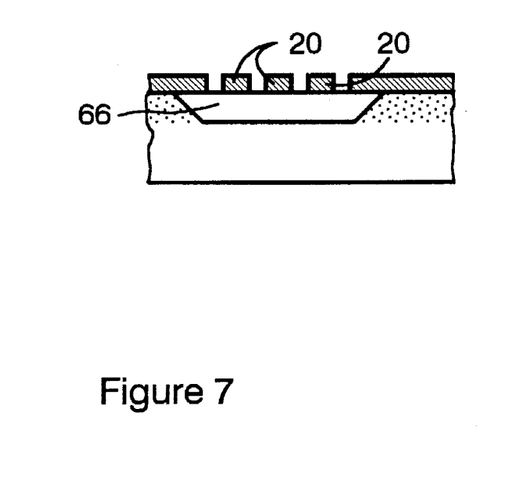

The photoresist layer 62 is then removed (FIG. 6), and with the silicon dioxide layer 60 protecting the polysilicon layer 58 and the underlying silicon wafer surface, the wafer is emersed in an etchant bath, e.g., BOE (buffered oxide etch), which passes through the openings 64 and selectively etches only the doped portions of the silicon wafer exposed through the openings 64 while not etching the other materials of the workpiece. The etching occurs both downwardly and laterally, thus undercutting the polysilicon layer 58 and forming a cavity 66 beneath beams 20a which extend from side to side of the cavity. At this time, the beams 20a are formed from the two layers 58 and 60. Then, the silicon dioxide layer 60 is removed, as by etching, leaving beams 20 of polysilicon only. The result is shown in FIG. 7.

As shown in FIG. 3, the beams 20 are connected at both ends to the cavity side walls, but include a necked or narrowed region 22 facilitating severing of selected beams to form a preselected pattern of cantilevered tines 14. As previously noted, a preferred method of severing the beams is by use of a laser or electron beam for rapidly heating and vaporizing the necked-in portions of the As previously noted, the devices can also be encoded by passing currents through selected beams for heating and vaporizing the necked-in portions 22 of the beams. To this end, after the various beams 20 have been formed (FIG. 7), a further masking and patterning process is used for providing a masking layer having openings exposing only selected beams and the two sides 16 and 18 of the device 10A shown in FIG. 3. Then, ions are introduced through the openings, e.g., by ion bombardment, for increasing the electrical conductivity of the selected beams and the two sides 16 and 18 to which the selected beams are connected. Current is then passed through the selected beams, severing them, by contacting electrodes from a power supply to the two sides 16 and 18. In FIG. 3, dotted areas I are shown indicating where ions are implanted for the subsequent severing of three beams 20 to provide the three tines 14 shown in FIG. 1.

Figure 8:
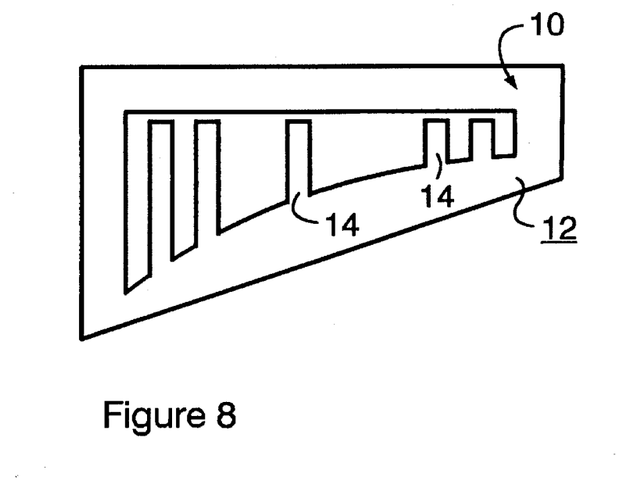
FIG. 8 is a view similar to FIG. 3 but showing another embodiment of the invention.

Alternatively, the patterning of the photoresist layer 62 can incorporate device encoding by delineating only cantilevered tines in selected patterns of tines. That is, rather than patterning all the devices being formed on the wafer 50 with identical patterns, as shown in FIG. 3, the surface of the wafer can be raster scanned by a narrow beam of light for selectively exposing the photoresist layer 12 (as shown, for example, in FIG. 8) for encoding each of the devices being made. With modern apparatus, such raster scanning and selective patterning can be performed relatively rapidly and relatively inexpensively, particularly because of the elimination of a subsequent encoding process. Alternatively, to reduce the amount of patterning provided in the scanning process, unencoded devices such as shown in FIG. 3 can be defined by exposure of a photoresist layer 64 (FIG. 4) as previously described. Then, before developing the photoresist layer 64, the layer 64 is scanned with a narrow beam of light for defining openings overlying the previously defined necked-in regions 22 of selected beams 20. After developing and etching, the openings 64 (FIG. 5) thus provided also define selected tines 14 in an encoded device.

Figure 3A:
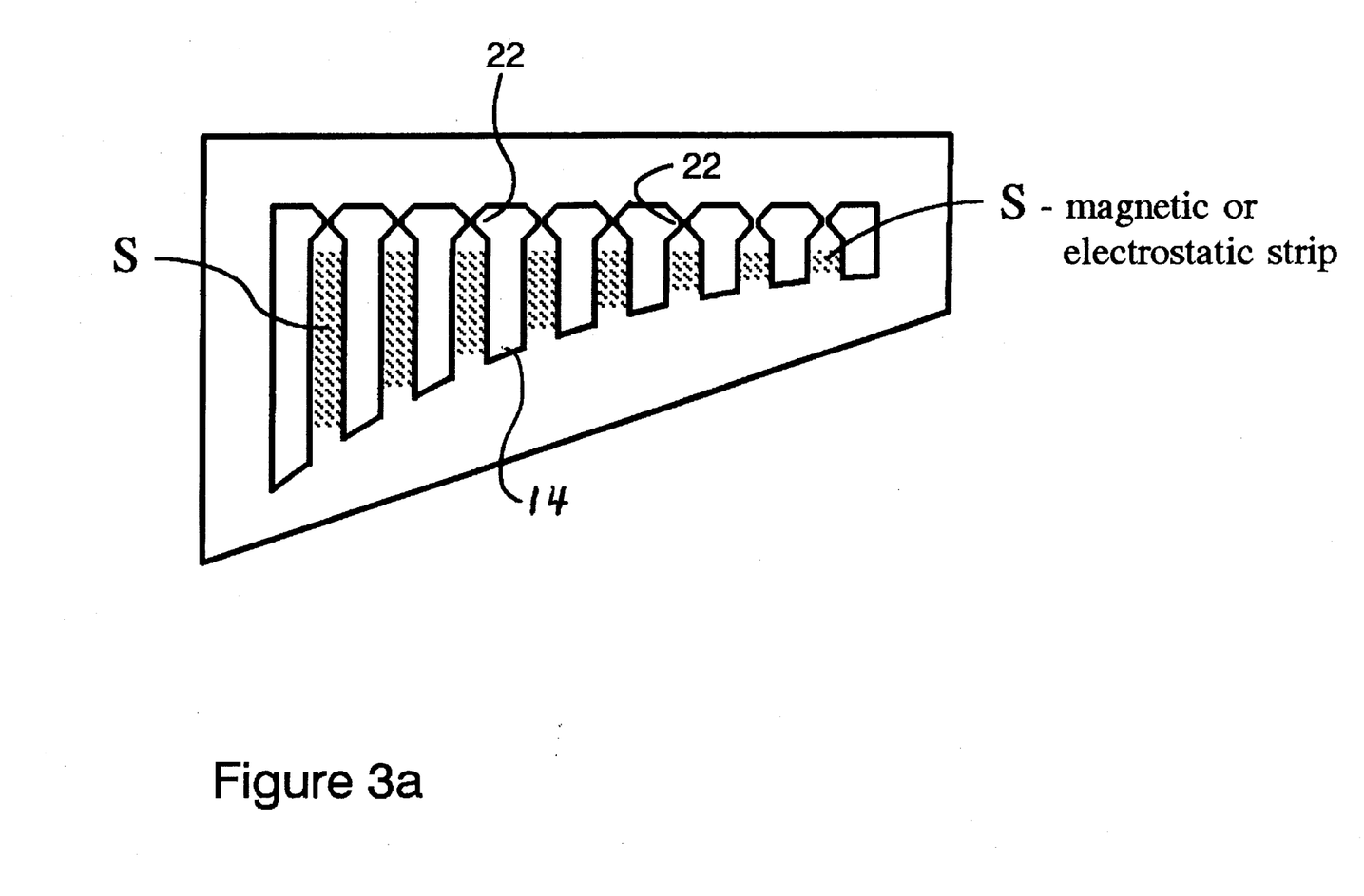
FIG. 3A is a view similar to FIG. 3 but showing a modification thereof and also showing strips of electrostatic or magnetic materials on the device tines.

Also, as shown in FIG. 3A, an unencoded device can comprise only tines 14 and no beams, and encoding is performed by removing selected tines. In FIG. 3A, all the tines 14 have necked-in portions 22 for facilitating removal of the selected tines, e.g., mechanically or electrically as hereinbefore described.

In all devices made using the aforedescribed semiconductor processing, the tines 14 comprise undoped polysilicon material, hence possess neither magnetic nor electrostatic properties. Accordingly, for employing the devices in magnetic or electrostatic modes of operation, it is necessary to provide the tines 14 with suitable magnetic or electrostatic characteristics. As previously noted, this can be done by providing a thin layer of appropriate material, e.g., a magnetic material such as nickel, or an electric charge storing material such as TEFLON (Dupont's trademark of polytetrafluoroethylene), which can be charged by an electron beam.

Such magnetic or charge storing strips can be quite thin, e.g., less than 1 μm, and the materials of the strips, e.g., the aforementioned nickel or TEFLON, can be deposited using known vapor deposition processes through patterned masks. FIG. 3A shows an example of a device including strips S of one of the aforementioned magnetic or electrostatic materials.

The device 10 can be used in the state shown in FIG. 1, i.e., not encapsulated. Preferably, however, the device 10 includes a cover for encapsulating the tines.

Figure 9:
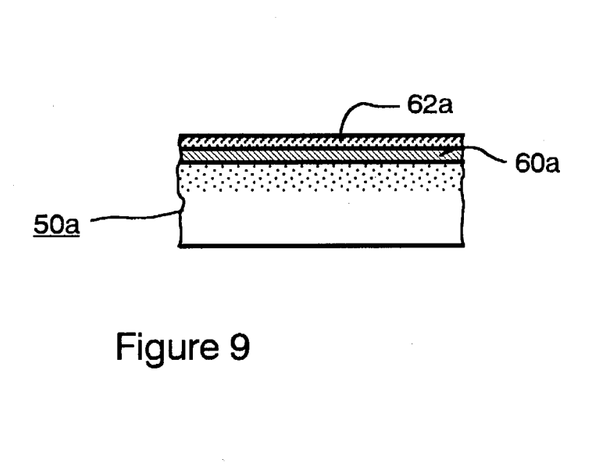
FIGS. 9–12 are similar to FIGS. 4–7 but showing sequential steps in the fabrication of an enclosure member for the inventive devices.

The fabrication of device covers can be substantially the same as the fabrication of the devices 10. Thus, the starting workpiece (FIG. 9) is a wafer 50a of partially doped silicon having a first layer 60a of silicon dioxide covered by a second layer 62a of a photoresist. Note that the wafer 50a is not provided with a layer of polysilicon as with the wafer 50 shown in FIG. 4.

Figure 10:
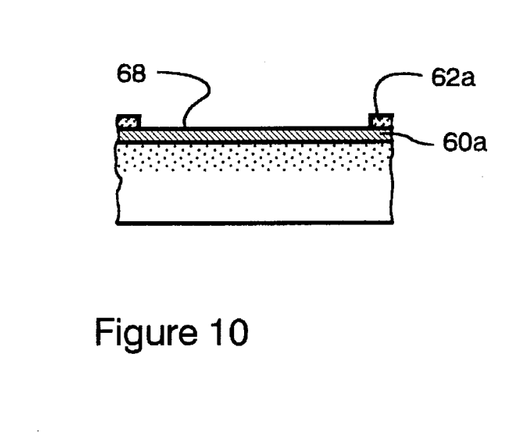
Figure 11:
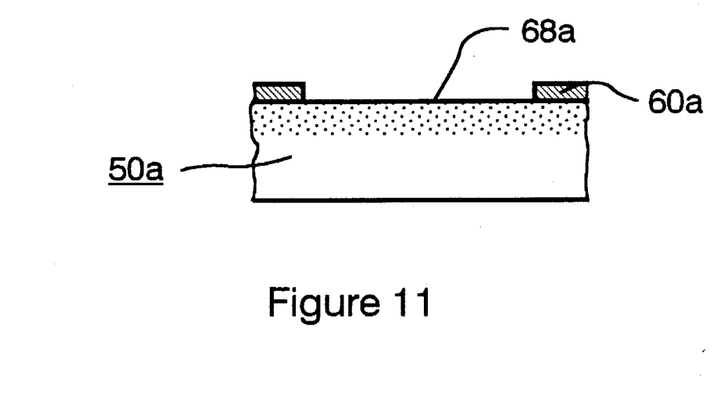
Figure 12:
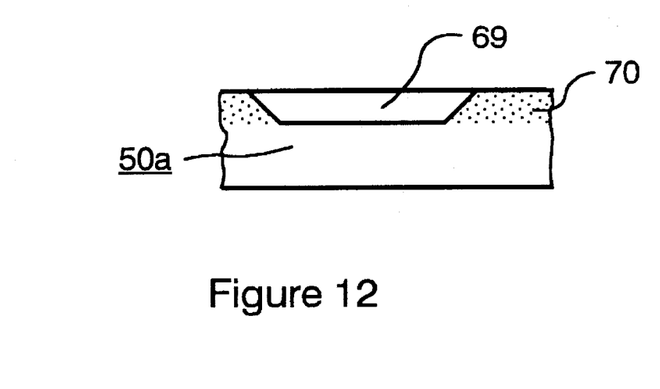

A photomask (not shown) is then used to define surface areas 68 (one only being shown in FIG. 10) corresponding in shape to the cavity 66 formed in the wafer 50 (FIG. 7) used to form the devices 10. The patterned photoresist layer 62a is then used as an etch mask to define a corresponding opening 68a (FIG. 11) through the layer 60a of silicon dioxide, and the layer 60a is then used as an etch mask for etching cavities 69 (FIG. 12) into the silicon wafer 50a. FIG. 12 shows the workpiece after the silicon dioxide layer 60a has been removed.

The wafer 50a, containing an array of dish-shaped covers 70 corresponding in size and shape to the devices 10 on the wafer 50, is then disposed over the wafer 50 (FIG. 13), and the two wafers 50 and 50a bonded together. Known bonding techniques can be used, e.g., use of an intermediate layer of epoxy, or "fusion bonding" where the surfaces of the two wafers are pressed together very closely and heated. In the fusion process, atoms migrate across the interface between the surfaces and form a molecular bond.

Figure 13:
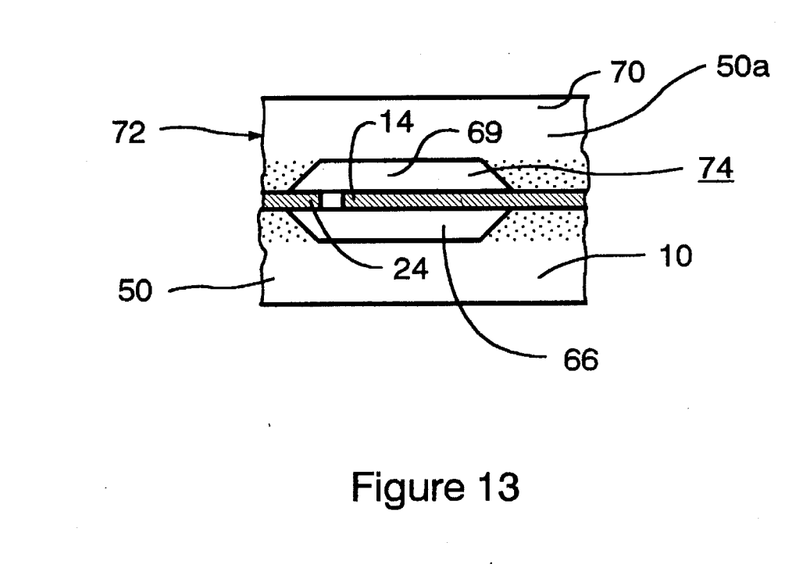
FIG. 13 shows a preferred embodiment of an encapsulated marking device in accordance with this invention.

After bonding together of the two wafers, the wafers are then diced into individual devices. As shown in FIG. 13, each device 72 includes a composite cavity 74 formed by the two cavities 66 and 69 (FIGS. 7 and 12) allowing free vibration of the tines 14.

In a preferred embodiment, the cover to device bonding is performed within an oxygen atmosphere, and the devices so formed contain oxygen which is gradually absorbed into the silicon providing a vacuum within the cavity 74. In use of the device, the tines thus vibrate within a vacuum which reduces energy loss of the vibrating tines. This allows vibrations of greater amplitude and larger duration.

An additional advantage of the fabrication process employing semiconductor processing is that the marking devices can comprise integral portions of semiconductor devices, e.g., large scale integrated circuits. For example, using the process described in connection with FIGS. 4–7 (or FIGS. 4–8), a single marking device can be fabricated on a small portion of a semiconductor wafer more or less simultaneously with the formation of a semiconductor device on another portion of the wafer. In general, the various processing steps used in the fabrication of the marking and semiconductor devices will be somewhat different and the one device, e.g., the semiconductor device, can be completely fabricated and then totally masked against the processes used in the fabrication of the other device. Obviously, compatible processes are required.

What is claimed is:

1. A method for obtaining data from a product having mounted thereon a data containing device, said device including a plurality of cantilevered tines each having a characteristic resonant frequency of vibration and said tines being present in a pattern of tines providing encoded data, the method comprising embedding said device within a product and applying acoustic energy directly against the product for transmission of the energy through the product to said device and to all of said tines for exciting all of said tines into vibrations at their respective resonant frequencies, and detecting and identifying the resonant frequencies generated by said device for determining the pattern of tines present therein.

2. A method of fabricating a marking device comprising providing a plurality of openings through a layer of polysilicon overlying a body of silicon, said openings delineating a plurality of different length, elongated beams, and etching said silicon body through said openings for providing a cavity within said body, said cavity underlying said beams and said beams having opposite ends secured to side walls of said cavity, and severing one end of selected beams from adjacent one of said side walls for providing a preselected pattern of different length cantilevered tines.

3. A method according to claim 2 wherein said openings delineate polysilicon beams in contact with a surface of said silicon body and, during said etching of said silicon body, said silicon surface contacting said beams is removed leaving unsupported beams of said polysilicon.

4. A method according to claim 2 including, after the step of severing, filling said cavity with oxygen and providing an enclosure for said device and said oxygen containing cavity, whereby, upon subsequent absorption of said oxygen into said silicon body, said cavity is substantially gas free.

5. A device for encoding data comprising a support structure including a pair of oppositely disposed, spaced apart sides, a plurality of cantilevered tines each having an end secured to a respective one of said sides, at least one beam extending between and secured to both said sides, each of said tines and said beams having a resonant frequency of vibration, and the resonant frequency of vibration of each of said tines being different from that of the others of said tines and from that of said beam.

6. A device according to claim 5 wherein said tines are present in a preselected pattern providing encoding of said device.

7. A device according to claim 6 wherein the spacing between said sides varies along the length of said sides.

8. A device according to claim 5 wherein said support structure and said sides comprise monocrystalline silicon and said tines and said beam comprise polycrystalline silicon.

9. A device according to claim 8 wherein said support structure comprises an enclosure for said device including an internal cavity, and said tines and said beam are disposed within said cavity.

10. A device according to claim 9 wherein said cavity is substantially gas free.

11. A device according to claim 5 including a product having an internal cavity, said device being disposed within said cavity and said cavity being sealed by a plug.

12. A device according to claim 5 including a plurality of beams and wherein the resonant frequencies of all of said tines fall within a first range of frequencies, the resonant frequencies of all of said beams fall within a second range of frequencies different from said first range, and each of said beams is adapted for being converted into a tine having a resonant frequency within said first range upon the severance of said each beam from one of said sides.

13. A device for encoding data comprising a comb-like structure including a support member and a plurality of cantilevered tines extending from said support member, the lengths of said tines varying from line to tine and each of said different length tines having a characteristic frequency of vibration, and each of said tines including a necked-in portion facilitating removal of selected tines from said device.

14. A device according to claim 13 wherein all of said necked-in portions are linearly disposed relative to one another along the length of said support member.

15. A device for encoding data comprising a structure having a pair of spaced apart first and second sides, the space between said sides varying along the length of said structure, and a plurality of spaced apart beams extending across said space, each of said beams having opposite ends connected to respective ones of said first and second sides, the lengths of said beams varying from beam to beam, and each of said beams including a necked-in portion facilitating severing said beams at said necked-in portions for converting selected beams to cantilevered tines having respectively different resonant frequencies of vibration.

16. A device for encoding data comprising a support structure and a plurality of different length, cantilevered tines extending from said support structure, said tines being of silicon and said tines including additive materials providing said tines with one of magnetic and electrostatic characteristics.

17. A device according to claim 16 including a layer of material overlying each of said tines, said layer including said additive materials.

18. A device according to claim 17 wherein said layer is of a magnetic material.

19. A device according to claim 17 wherein said layer is of polytetrofluorethylene and said additive materials comprise electrons stored within said layer.

20. A device for encoding data comprising a support structure including a pair of oppositely disposed, spaced apart sides and a plurality of different length beams extending between and secured to said sides, said sides and first ones of said beams being highly electrically conductive in comparison with second ones of said beams, whereby, upon the application of a voltage between said two sides, said first ones of said beams are severed in response to current flow therethrough.

21. A method of fabricating a marking device comprising forming a structure including a plurality of members each having a resonant frequency of vibration within a first range of frequencies, and fixedly modifying at least some of said members for changing the resonant frequency of vibration thereof to fall within a second range of frequencies different from said first range, and wherein said modifying results in all of said modified members having resonant frequencies different from one another for encoding data into said device.

* * * * *